(12) United States Patent
Vincenzi (10) Patent No.: US 8,590,795 B2
(45) Date of Patent: Nov. 26, 2013

(54) CRADLE FOR CODED INFORMATION READER AND READING SYSTEM COMPRISING IT

(75) Inventor: Donato Vincenzi, Cento (IT)

(73) Assignee: Datalogic Scanning Group S.R.L., Lippo di Calderara di Reno (BO) (IT)

( * ) Notice: Subject to any disclaimer, the term of this patent is extended or adjusted under 35 U.S.C. 154(b) by 76 days.

(21) Appl. No.: 12/993,161

(22) PCT Filed: May 28, 2008

(86) PCT No.: PCT/IT2008/000352
§ 371 (c)(1),
(2), (4) Date: Nov. 17, 2010

(87) PCT Pub. No.: WO2009/144750
PCT Pub. Date: Dec. 3, 2009

(65) Prior Publication Data
US 2011/0069877 A1    Mar. 24, 2011

(51) Int. Cl.
*G06K 7/10* (2006.01)
(52) U.S. Cl.
USPC .................................................. 235/472.02
(58) Field of Classification Search
USPC ............... 235/472.01–472.03, 375, 492, 486, 235/487, 380
See application file for complete search history.

(56) References Cited

U.S. PATENT DOCUMENTS

| | | | |
|---|---|---|---|
| 3,842,281 A | 10/1974 | Goodrich | |
| 5,155,346 A | 10/1992 | Doing et al. | |
| 5,661,292 A | 8/1997 | Knowles et al. | |
| 5,796,091 A | 8/1998 | Schmidt et al. | |
| 5,949,052 A * | 9/1999 | Longacre et al. | 235/462.08 |
| 6,123,263 A | 9/2000 | Feng | |
| 6,184,534 B1 | 2/2001 | Stephany et al. | |
| 6,216,951 B1 * | 4/2001 | Swift et al. | 235/462.45 |
| 6,394,355 B1 * | 5/2002 | Schlieffers et al. | 235/472.01 |
| 6,832,729 B1 | 12/2004 | Perry et al. | |
| 6,860,427 B1 | 3/2005 | Schmidt et al. | |
| 7,040,540 B2 | 5/2006 | Knowles et al. | |
| 7,048,188 B2 | 5/2006 | Kumagai et al. | |
| 7,051,940 B2 | 5/2006 | Tamburrini et al. | |
| 7,222,794 B2 | 5/2007 | Kumagai et al. | |
| 8,186,592 B2 | 5/2012 | Fletcher | |
| 2003/0098350 A1 | 5/2003 | Liou et al. | |
| 2004/0206822 A1 | 10/2004 | Crandall | |
| 2011/0073658 A1 | 3/2011 | Vassura et al. | |

FOREIGN PATENT DOCUMENTS

WO    WO2007076932 A2    7/2007
WO    WO2009/144751 A1    12/2009

OTHER PUBLICATIONS

International Preliminary Report on Patentability dated Nov. 30, 2010 from corresponding International Application No. PCT/IT2008/000352.
International Search Report Dated Feb. 3, 2009 from corresponding International Application No. PCT/IT2008/000352.
U.S. Appl. No. 12/993,169, filed Nov. 17, 2010, titled "Recharge Cradle for Coded Information Reader and Reading System Comprising It".

* cited by examiner

*Primary Examiner* — Thien M Le
(74) *Attorney, Agent, or Firm* — Duane Morris LLP (57) ABSTRACT

In a reading system, a cradle for a coded information reader includes at least one security information interaction device.

14 Claims, 9 Drawing Sheets

CRADLE FOR CODED INFORMATION READER AND READING SYSTEM COMPRISING IT

FIELD OF THE INVENTION

The present invention relates to a cradle for a coded information reader, as well as a reading system comprising it.

The present invention also relates to the use of such a reading system for the verification of authenticity of banknotes, documents and the like in a working station provided with an optical code reader.

Hereinafter in the present description and in the subsequent claims, the expression "coded information" is used for indicating both an "optical code" as better specified below, and coded information stored in an RFID transponder or tag.

BACKGROUND OF THE INVENTION

An RFID transponder or tag is an electronic component composed of a chip and an antenna. The chip comprises a non-volatile memory containing a unique code. An RFID reader generates an electromagnetic/electric field at an excitation frequency for the RFID transponder which, once entered into such a field, transmits a signal containing the unique code towards the RFID reader. An analogous method is used for writing information in the RFID transponder. In the case of a passive RFID tag, the power supply is obtained via induction by the electromagnetic/electric field; active RFID tags are instead fed by a small internal battery. An RFID tag can have even very small size, such as to permit insertion thereof in labels for commercial products or in credit cards and tickets, so-called "contactless smart cards"

The expression "optical code" is used for indicating any graphical representation having the function of storing information coded by means of suitable combinations of elements of a pre-established shape, for example square, rectangular or hexagonal elements, dark coloured (normally black) separated by light coloured elements (spaces, normally white), such as barcodes, stacked codes, i.e. with several stacked bar sequences, and two-dimensional codes in general, colour codes, etc., as well as alphanumeric characters and particular shapes or patterns such as for example stamps, logos, signatures etc. The expression "optical code" also comprises graphical representations detectable not only in the field of visible light, but also in the wavelength range comprised between infrared and ultraviolet.

In the optical code readers of the scanning type, a light beam, in particular a laser beam, suitably focused by suitable optics, is made to hit a deflection system, generally consisting of a rotating or oscillating mirror, in order to generate one or more scanning lines through the optical code. In the optical code readers of the imager type, the entire optical code is simultaneously illuminated. The light diffused by the code is collected by suitable optics and conveyed onto a photodetector element, which converts its intensity into an electrical signal. The distribution of the electrical signal over time during the illumination of the optical code by means of the scanning line, or the distribution of the electrical signal in space in case of illuminating the entire optical code, is indicative of the presence or absence, as well as relative size and possibly colour, of the elements composing the optical code. By means of such electrical signal, appropriately processed, it is therefore possible to acquire the optical code and decode the information coded therein.

A hand held optical code reader of the prior art is generally gun shaped and comprises a reading head provided with a light input and output window and a holdable handle, possibly provided with a trigger-type activation push-button and possible other control push-buttons.

The reader houses, suitably arranged between the head and the handle, the light source, the emission and reception optics, the possible deflection and/or scanning mirrors and the photodetector, as well as possibly one or more rechargeable batteries intended for supplying power to the same.

The reader can moreover house electronics for pre-processing the photodetector output signal, electronics for acquiring the code and possibly for decoding the code, recharging circuits of possible batteries, one or more memories, as well as a communication interface for transferring the electric signal output by the photodetector or the acquired optical code or also the decoded optical code, as well as for receiving setting commands and possibly remote-activation commands.

The hand held reader is associated with a so-called cradle, which in addition to acting as a support base for placing the reader when not in use, can also be used for collecting raw or already processed data from the reader, and for transferring such data to a remote processor, and for the transmission of configuration parameters to the reader. For such purpose, the cradle is provided with a communication interface compatible with that of the reader, as well as a second communication interface with the remote processor. It should be noted however that the transfer of the data and configuration parameters can also occur directly from the reader to the remote processor.

The cradle, supplied by the electrical mains through a cable, can also act as a recharging base of the reader. Possible transformers and recharging circuits can be housed in the cradle and/or in the reader. In order to provide the supply current to the reader batteries, the cradle is provided with electrical contacts that are coupled with electrical contacts of the reader when this is placed on the cradle. Of course, when the reader is hand held for use, the recharging of the batteries is interrupted.

If the cradle permits an upright positioning of the reader, this can also work without being held and directed by the operator, in a so-called "presentation scanner" mode. If the reader is cable-powered, the cradle can also be used simply as a support for the "presentation scanner" mode. Several readers are configured only for being held and directed by the operator, others only for operating as "presentation scanners", while others can operate in both modes.

The spreading of optical codes as an identification instrument of goods during commercial transactions has caused their spreading in a great number of points of sale. The operator reads the code on the product, determines its price, and receives the payment by the customer via credit card, debit card or banknotes.

Banknotes are usually provided with security or anti-counterfeit information integrated in the form of fluorescent fibres or inks, magnetic inks or holograms; the fluorescent inks in particular lit up when excited by luminous radiation of appropriate wavelength, usually UV but also IR, and emit visible light that the operator is capable of interpreting as a proof of the banknote's authenticity.

U.S. Pat. No. 3,842,281 describes a device for the visual verification of banknotes by means of UV sources, to be installed for example at points of sale; the operator accepts or refuses the banknote on the basis of the visual inspection conducted. This is a separate device, which requires space and temporary interruption of the sales process, with consequent loss of time.

U.S. Pat. No. 6,184,534 B1 and U.S. Pat. No. 6,123,263 describe hand held readers of fluorescent coded information or signs, including a UV radiation lighting device and an associated radiation sensor.

U.S. Pat. No. 6,832,729 describes a hand held reader of fluorescent coded information, such as optical codes and security information on banknotes, combined with a digital camera for aiming the reader and capturing colour images. Also mentioned is the possibility to decode non-fluorescent coded information.

The devices of these three documents carry out a complete acquisition of the fluorescent image and its processing.

US 2004/206822 A1 describes a barcode reader combined with a device for writing the read barcodes on a smart card.

US 2003/0098350 A1 describes a hand held device provided with a visible light optical code reader and with a UV illuminator, connected to separate activation switches on the reader handle, which can be used for scanning optical codes and for the anti-counterfeit verification of banknotes.

In this manner, the operator is provided with a verification system during the commercial transaction that simplifies the process, without weighing down the verification with an actual image processing, which would require time and would complicate the system. Indeed, this system provides only a visual indication, highlighting those characteristics that can help the operator in deciding upon the banknote's authenticity.

The incorporation of such verification systems into the hand held reader, however, makes such device complex and expensive and increases its energy requirement. In addition, their use is not particularly discreet with respect to clients.

The technical problem at the basis of the present invention is to overcome the aforesaid drawbacks.

SUMMARY OF THE INVENTION

In a first aspect thereof, the invention relates to a cradle for a coded information reader, characterised by comprising at least one security information interaction device.

By inserting the interaction device in the cradle, the reader does not require modifications and turns out to be simpler, cheaper and less power consuming. Moreover, by inserting the interaction device in the cradle, it is arranged near the operator and liable to be confused with the reader apparatus, thus making the security information verification operation more discreet in addition to saving space with respect to the use of a stand alone device.

In the present description and attached claims, the expression "security information" is used to broadly indicate an anti-counterfeit or authenticity characteristic of a banknote document or an object, personal identification information, credit information, information related to gift point collections and the like.

Such security information can for example comprise fluorescence detectable under lighting with UV or IR radiation, a watermark, a hologram, a magnetic ink, as well as coded information in an RFID tag, incorporated in banknotes, checks, credit or debit cards and other bank documents or in objects such as promotional tickets.

The interaction can consist in making said security information directly intelligible to a human operator, for example making the fluorescence of a banknote visible, or in decoding said information and providing the operator with a decoding results indication, for example signalling the presence or absence of a magnetic ink, or also in modifying said security information, for example modifying the memory of an RFID tag following the completed transaction.

Said at least one security information interaction device can be selected from the group consisting of a UV radiation emitter, an IR radiation emitter, a laser emitter a white light emitter, a backlit surface, a magnetic sensor and an RFID detector.

Said security information interaction device can further comprise an indicator of the security information verification result, preferably at least one LED and/or an acoustic indicator.

Preferably, said cradle has an operator side and a customer side, and said at least one security information interaction device is arranged on the operator side.

In this manner, the reading apparatus is interposed between the operator and the customer, making the verification operation even more discreet and preventing the client from interpreting this as a lack of trust by the operator.

Even more preferably, said operator side is opposed to said client side.

In one embodiment, said cradle is configured for being supported on or fixed to a surface and said at least one security information interaction device comprises at least one radiation source directed towards said surface.

In this manner, the verification does not lead to the risk of accidentally exposing the client or the operator to potentially harmful radiation, the source being turned towards the support or fixing surface of the cradle.

Said cradle can comprise at least one selective activation device of said at least one security information interaction device.

Said at least one selective activation device can be selected from the group consisting of an intermittently pulsed activator, a timer, a push-button switch and a receiver of a remote activation command, in particular from the coded information reader.

In order to facilitate its location by the operator, the push-button switch can be backlit.

Advantageously, said cradle comprises a support tray for a document or object comprising said security information.

Even more advantageously, said support tray incorporates a selective activation push-button of said at least one security information interaction device.

In such a manner, the push-button can be automatically activated upon resting the document or object on the support tray.

Said security information interaction device can comprise a transparent or diffusing support surface and a backlighting system in said support tray.

In such a manner, it is possible to highlight some characteristics only visible against the light, such as the watermark.

When said at least one security information interaction device comprises a radiation emitter, it can further comprise optics for shaping the emitted radiation, preferably selected from the group consisting of a spherical, aspherical, cylindrical, toric lens and a lens of locally defined arbitrary shape as described in WO 2007/076932 A2.

When said at least one security information interaction device comprises a UV or IR radiation emitter, it can further comprise a rejection filter for the visible light portion emitted by said radiation emitter.

Said at least one security information interaction device can be cable or battery powered.

In a second aspect thereof, the invention relates to a coded information reading system comprising a hand held coded information reader and a cradle as described above having a seat for the coded information reader.

In a third aspect thereof, the invention relates to the use of such a coded information reading system for the authenticity verification of banknotes, documents and the like in a working station.

BRIEF DESCRIPTION OF THE DRAWINGS

These and other advantages of the present invention will be better understood from the following detailed description of several embodiments thereof, made with reference to the attached drawings, provided merely as exemplifying and non-limiting. In the drawings.

In the drawings, similar parts and components are identified with similar numbers.

DETAILED DESCRIPTION

Figure 1:
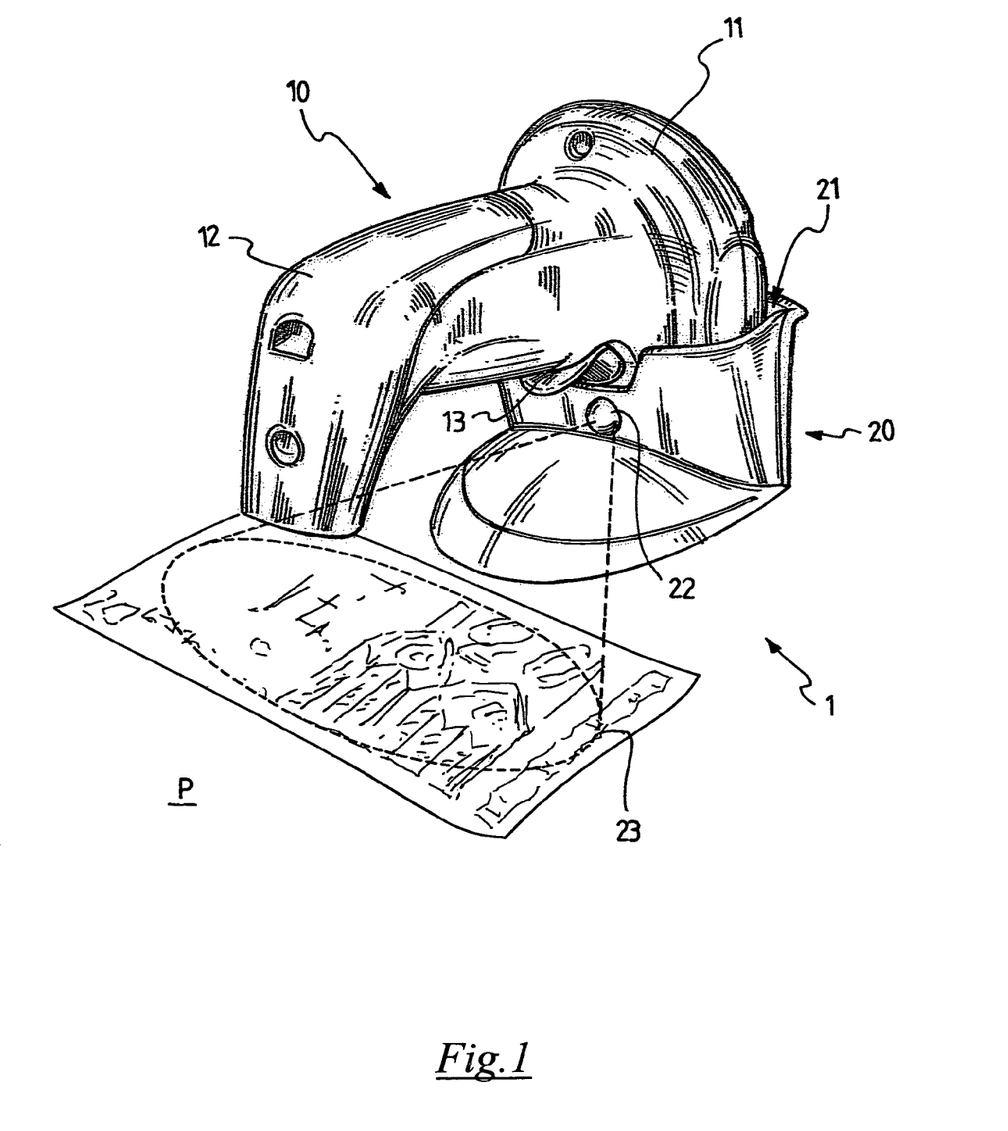
FIG. 1-9 illustrate nine embodiments of a coded information reading system according to the invention.

In FIG. 1, a coded information reading system 1 is shown, comprising a coded information reader 10 of hand held type, and a cradle 20 for the reader 10.

The reader 10 is in general gun shaped, and comprises a reading head 11 and a holdable handle 12, which can be provided with a trigger-type activation push-button 13 and possible other command push-buttons (not shown).

The head 11 of the reader 10 is shaped for being inserted in a seat 21 of the cradle 20, the handle 12 projecting overhanging so to be easily handled, when extracting it from the cradle 20 for use.

The reader 10 moreover houses one or more rechargeable batteries intended for supplying power to its components, and possibly recharge circuits therefor.

Alternatively, the reader 10 can be cable-powered from the mains.

In the case of battery powered reader 10 and recharging cradle 20, the cradle 20 is powered from the mains by means of a cable (not shown) and the head 11 of the reader 10 has electrical contacts in such a position as to enter into contact with electrical contacts of the cradle 20 when the reader 10 is placed in the seat 21 of the cradle 20.

In case of optical code reader, the head 11 is provided with a light input and output window (not shown), and the reader 10 houses, appropriately arranged between the head 11 and the handle 12, a light beam emission source, emission and reception optics and a photodetector, as well as possible mirrors for scanning the light beam emitted by the light source and/or mirrors for deflecting such light beam towards the window and/or for deflecting the light diffused by the optical code entering from the window onto the photodetector, according to any configuration known in the art.

The reader 10 can further house pre-processing electronics of the photodetector output signal, electronics for acquiring the code and possibly for decoding the optical code, one or more memories, as well as a communication interface for transferring the electrical signal output by the photodetector, the acquired optical code or also the decoded optical code, as well as for receiving setting commands and possible remote activation commands. The communication can be of the type via cable, radio, infrared or other type.

The reader 10 can, alternatively or additionally, read and/or write RFID tags via radiofrequency. In such a case, the reader 10 comprises means for generating an electromagnetic/electric field at an excitation frequency for the RFID transponder and a receiving, transmitting or transceiving antenna for receiving and/or transmitting a signal containing a code stored in an RFID tag. The RFID reader can further comprise processing and/or decoding electronics of such signal and possibly one or more memories, as well as a communication interface, analogously to the optical code reader.

The communication interface of the reader 10 can be directly coupled to an interface of a remote processor.

Alternatively, the communication interface of the reader 10 can be coupled to a suitable communication interface of the cradle 20.

Communication can occur via cable, by means of contacts in addition to the possible power supply/recharge contacts, but can also occur via infrared communication, via radio communication or in other modes; in such a case, the cradle 1 houses a receiving, transmitting or transceiving antenna or an infrared emitter and/or receiver device, corresponding devices being provided for in the reader 10.

The cradle 20 can in such a case act as a collector of raw or processed data, related to the coded information detected by the reader 10. The cradle 20 can in such a case provide for a memory for such data, processing and/or decoding electronics of the same and/or a communication interface with a remote processor. Also the communication with the remote processor can occur via cable or via infrared, corresponding devices being provided for in the cradle 20.

By means of the communication interface(s), the cradle 20 can also provide for sending to the reader 10 configuration parameters set by means of a user interface of the cradle 20 itself, or for forwarding configuration parameters of the reader set in the remote processor.

The user interface can further comprise one or more acoustic and/or luminous indicator devices, such as a buzzer and/or a LED signalling that charging is underway, that acquisition is underway, that data transmission is underway, signalling diagnostics and the like. The buzzer can be made with an eccentric micromotor, for example one of the type employed in mobile phones.

The user interface can further comprise one or more pushbuttons for enabling and disabling such acoustic and/or luminous signalling devices.

The cradle 20 is in particular a support and/or recharge cradle for the reader 10, in the case of an optical code reader; in fact, its seat 21 receives the head 11 of the reader 10 from the side of the light input/output window (not visible in the figure), so that the reader 10, when it is placed in the cradle 20, is not usable.

On the side of the handle 12 of the reader 10, i.e. on the operator side of the reading system 1 and of the cradle 20, the cradle 20 has a radiation source 22 which projects a radiation beam towards a support surface P of the cradle 20, therefore without the risk of accidentally exposing the customer or the operator to potentially harmful radiation.

The radiation source 22 is powered through the mains or battery powered; in the second case there will be one or more batteries in the cradle 20.

A UV radiation source 22, advantageously usable in particular in the case of battery power supply of the cradle 20, comprises one or more UV LED(s), such as NSSU100A LEDs of Nichia Corp., TOKUSHIMA, Japan, which have high efficiency and low energy consumption, mounted on a printed circuit within the cradle 20.

Other usable UV sources comprise a fluorescence tube, a UV laser, or a visible light source coupled with a frequency doubler crystal.

The radiation source 22 can alternatively be an IR source, a laser source or a white light source.

Optics for shaping the radiation beam into a desired shape on the support surface P, for example according to an oval field 23 as shown, or along a rectangular or strip-like field, can be coupled to the radiation source 22.

The shaping optics can include, for example, a spherical, aspherical, cylindrical, toric lens or a lens of locally defined arbitrary shape as described in WO 2007/076932 A2.

A rejection filter for the visible light emitted at the same time as the UV radiation by the radiation source 22 can also be coupled to such a radiation source 22.

The radiation source 22 can always be on or it can be intermittent and/or on for a certain period of time following a switch on command, by means of a timer electronics circuit possibly integrated in the same printed circuit that bears the radiation source 22.

The switch on command of the radiation source 22 can for example be imparted through a suitable push-button located on the cradle and actuated by the operator, through a push-button arranged in the seat 21 of the cradle 20 and automatically actuated when the reader 10 is placed therein, through a software signal generated by means of a push-button of the reader 10, or also by a processor with which the reading system 1 is associated, for example at the time of request of the total sum to be paid.

In order to facilitate its location by the operator, the possible push-button on the cradle 20 can be backlit.

Moreover, several radiation sources 22 can be provided for, simultaneously or alternatively turned on.

When an operator of the reading system 1 arranges, for example, a banknote within field 23, as illustrated in FIG. 1, the fluorescent ink or fluorescent fibres provided in the banknote itself, excited by the UV or IR radiation, emit visible light that the operator is capable of interpreting as a proof of the banknote's authenticity. In the absence of such visible emission, the operator recognises that the banknote is false.

Similarly, laser light or white light permits highlighting a hologram provided on the banknote.

Other bank documents that are typically provided with such security information or anti-counterfeit characteristics include checks, credit or debit cards, and identification badges.

It is noted that in a typical working station, for example at a point of sale, the field 23, in addition to being on the operator side of the system 1, can be liable to be confused by a client with whatever area of the support surface P of the operator. In other words, the action of resting the banknote within the field 23 is not easily recognised by the client as an action for verifying the authenticity of the banknote, thus resulting particularly discreet.

Figure 2:
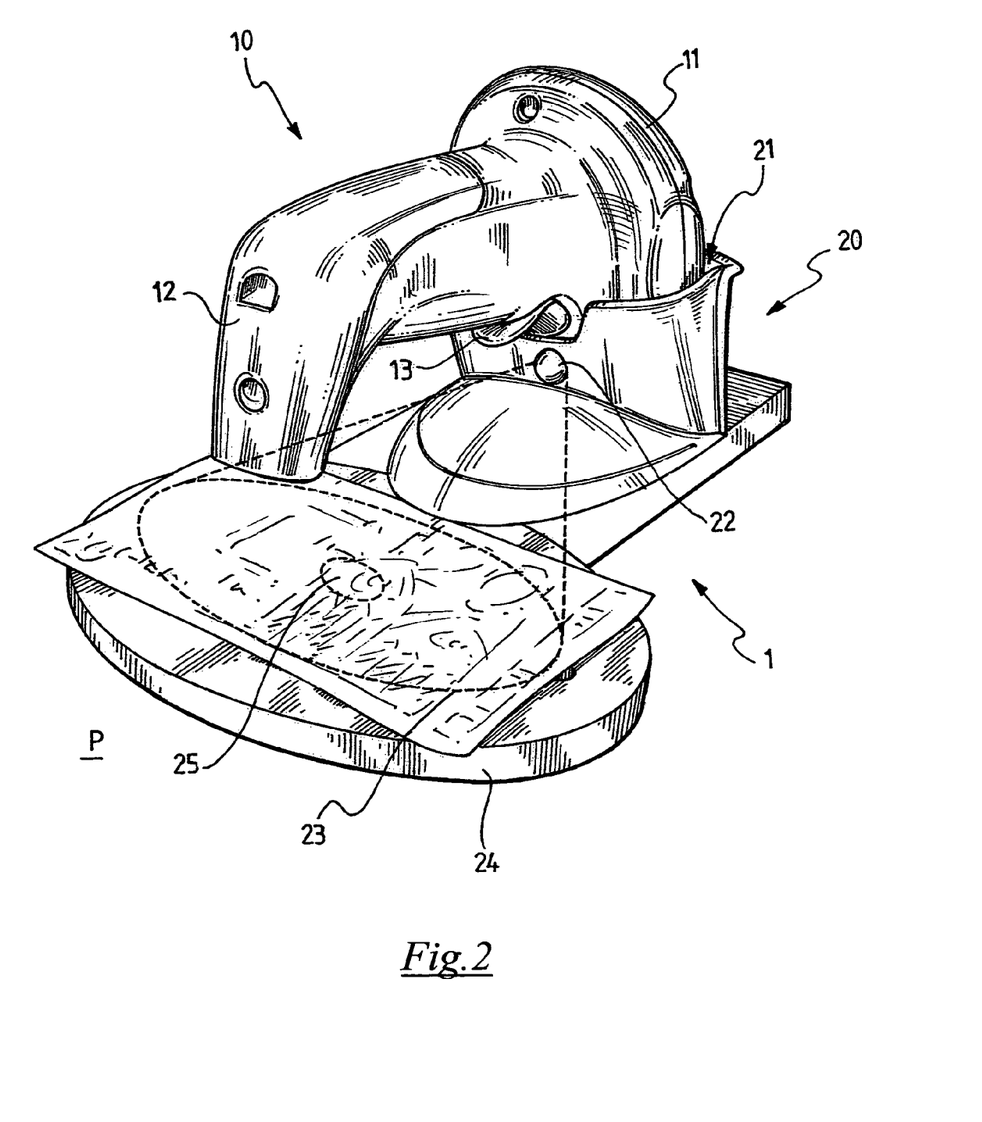

The embodiment of FIG. 2 differs from that of FIG. 1 in that the cradle 20 is provided with a support tray 24 of the banknote or other object to be verified. Such a tray 24, in addition to facilitating the correct arrangement of the banknote or object by the operator, can advantageously house an activation push-button 25 for the radiation source 22, which can therefore be pushed by the weight of the object itself or by the operator when resting the object. The push-button 25 can also be located outside the field 23, for example on the edge of the tray 24.

Figure 3:
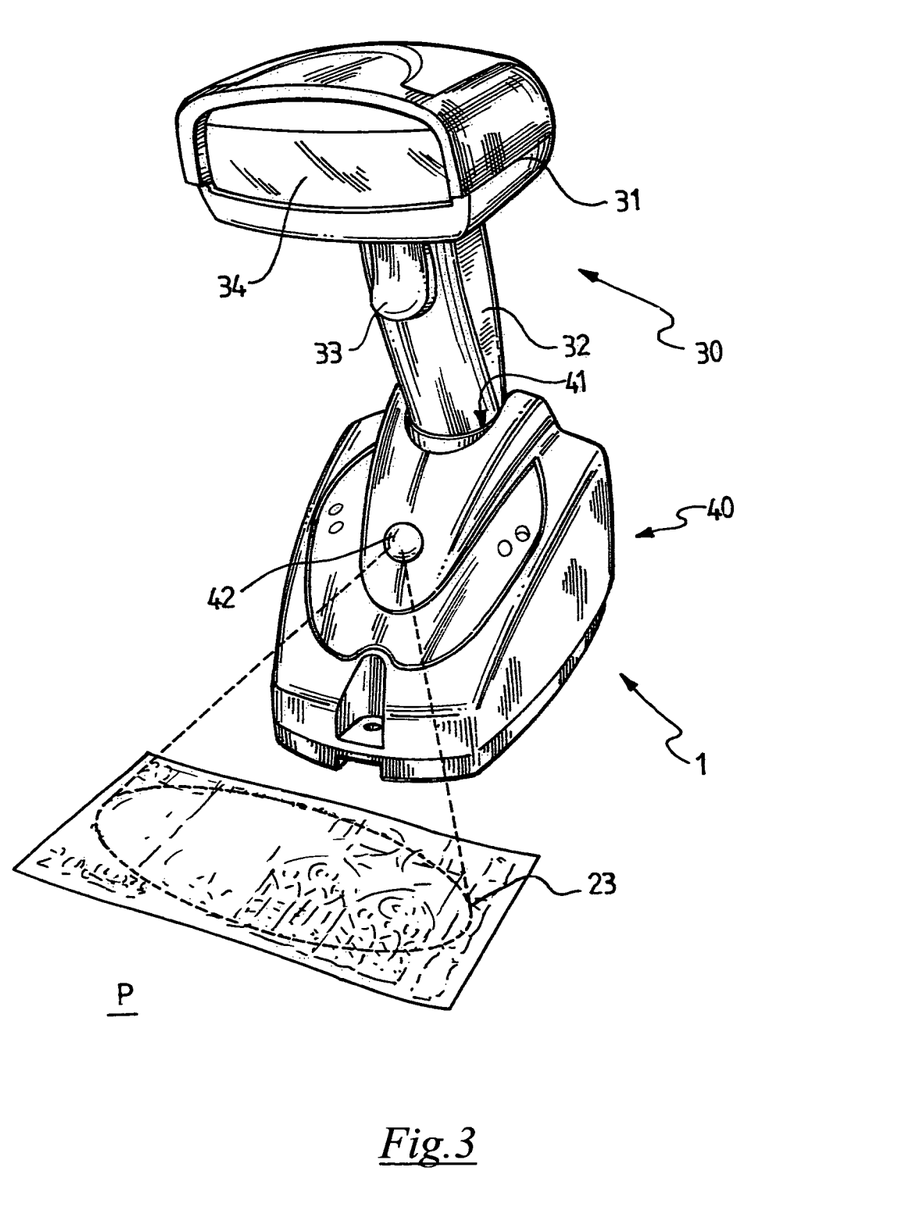

The embodiment of FIG. 3 differs from that of FIG. 1 in that the cradle 40 is shaped for supporting the handle 32 of the reader 30 rather than its head. In the case of an optical code reader 30, the input/output window 34 of the reader 30 is therefore free and the reader 30 is in a position that permits its use, in a so-called "presentation scanner" mode, as an alternative or in addition to the use by holding the reader 30.

In addition, the radiation source 42 of the cradle 40 is not arranged on the side of the operator, rather on the opposite side. In any case, the verification operation is sufficiently discreet, since the reader system 1 is typically arranged near the operator and the security information verification device—the radiation source 42 in this case—is liable to be confused with the coded information reading system.

Figure 4:
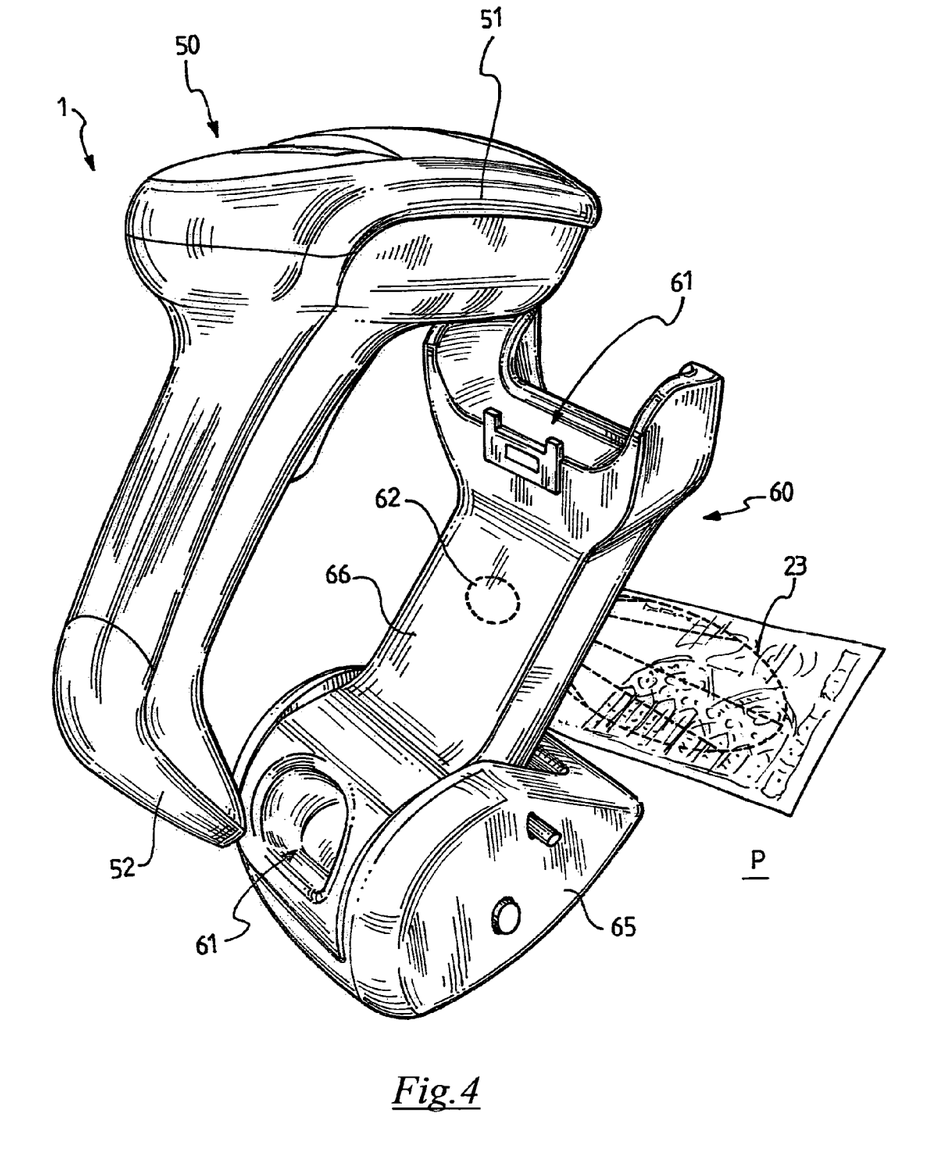

The embodiment of FIG. 4 also differs from that of FIG. 1 in that the radiation source 62 of the cradle 60 is not arranged on the operator side, rather on the opposite side.

In addition, the cradle 60 is shaped for supporting both the handle 52 of the reader 50 and its head 51, leaving however its light input/output window 54 free, in the case of an optical code reader 50. Thus, also the reader 50 is in a position that permits its use in "presentation scanner" mode, alternatively or in addition to the use holding the reader 50.

The cradle 60 also has a base part 65 and a support part 66 of the reader 50, wherein the support part 66 is coupled to the base part 65 so that it can be oriented in at least two different angular positions, so as for example to be able to optimise the working station and/or turn the reading system towards the support surface P and minimize the size and the risk that the reader 50 could fall.

Advantageously, the electrical contacts of the cradle 60 for the power supply/recharging and/or communication with the reader 50 are arranged within the seat 61, so that the electrical contact is maintained irrespectively of the orientation of the support part 66 with respect to the base part 65.

Further structural details of the cradle 60 can be found in the patent application entitled "Recharge cradle for coded information reader and reading system comprising the same" filed on even date by the same Applicant and herein incorporated by reference.

Figure 5:
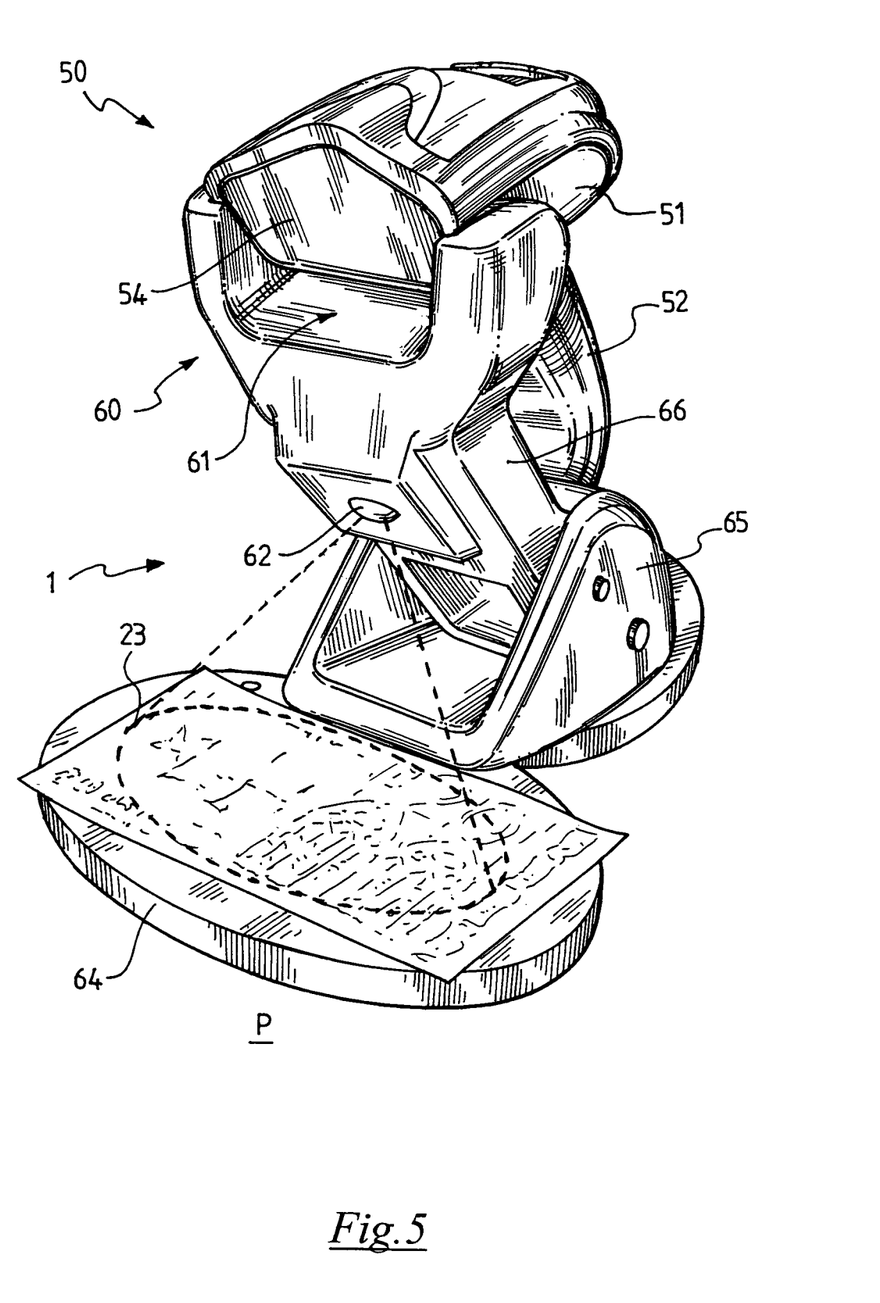

The embodiment of FIG. 5 differs from that of FIG. 4 in that the cradle 60 is provided with a support tray 64 of the banknote or other object to be verified, analogously to the tray 24 of the embodiment of FIG. 2.

Figure 6:
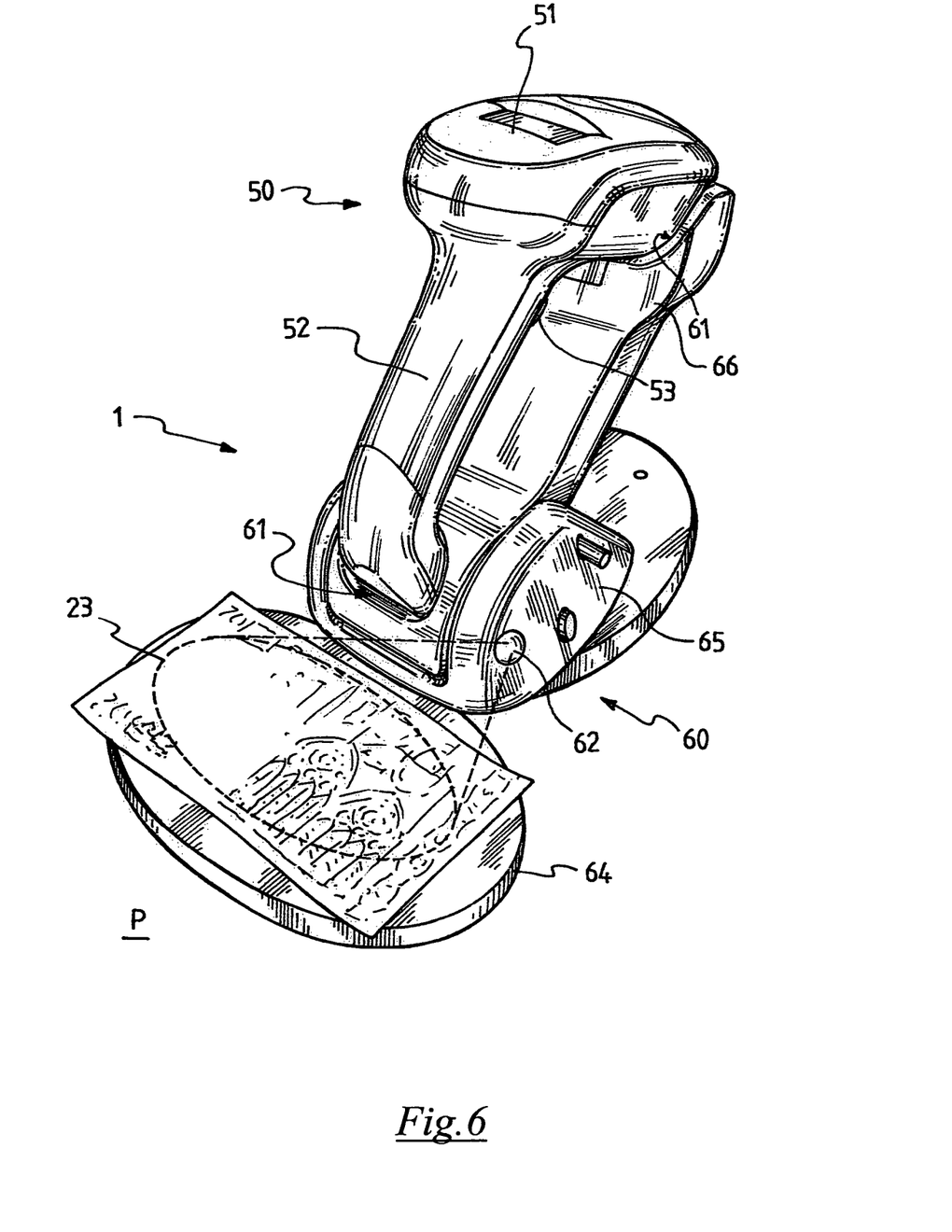

The embodiment of FIG. 6 differs from that of FIG. 5 in that the support tray 64 of the banknote or other object to be verified is arranged on the operator side of the cradle 60.

Figure 7:
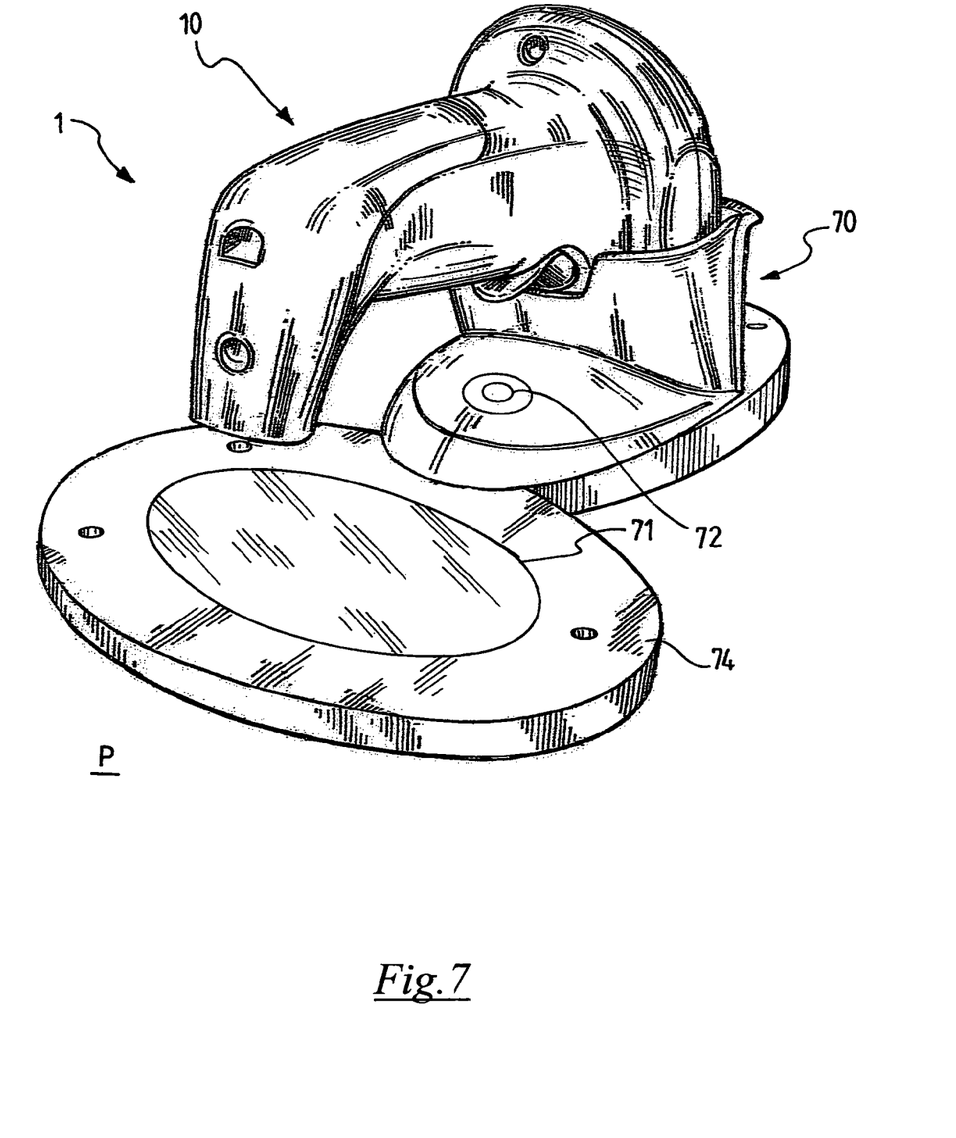

In the embodiment of FIG. 7, the cradle 70, which by way of an example is shown as support/recharge type only analogously to FIG. 1, comprises a backlit surface 71 made on the tray 74 as security information interaction device. The surface 71 can, for example, be made of glass or transparent or diffusing plastic. The backlighting system can comprise, for example, LEDS on an integrated circuit housed within the tray 74 directly underneath the surface 71, or one or more LEDs arranged laterally of the surface 71 and a light guide system towards the surface 71. A push-button switch 72 is shown on the cradle 70 for turning on the backlighting system, but the abovementioned considerations regarding the activation of the radiation source 22 hold true.

Such a device permits highlighting anti-counterfeit characteristics or security information that are only visible against the light, such as the watermark.

Figure 8:
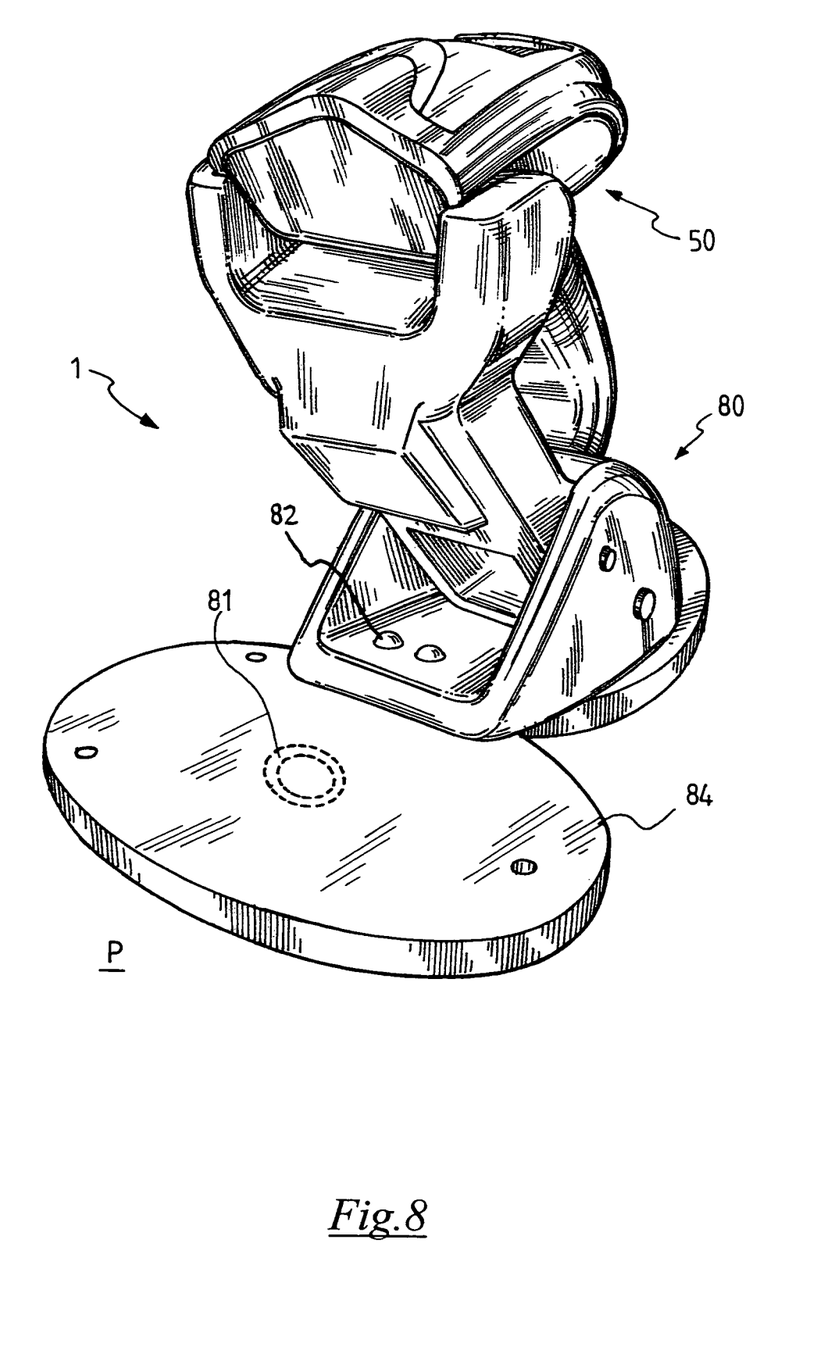

In the embodiment of FIG. 8, the cradle 80, which by way of an example is shown of the orientable type analogously to FIG. 4, comprises a magnetic sensor 81 made on the tray 84 as security information interaction device.

An advantageously usable magnetic sensor 81 is the sensor SDV1003B of MagnaTec, Lutterworth, Leicestershire, England.

The magnetic sensor 81 is suitable for detecting the presence/absence of the security information, providing a variable voltage output when an object printed with magnetic ink, such as a banknote or other bank document, is slid over the tray 84.

Regarding the activation of the magnetic sensor 81, the abovementioned considerations with regard to the activation of the radiation source 22 hold true.

In order to provide the operator with an indication of the detected presence or absence of the magnetic ink, the cradle 80 can comprise one or more LEDS 82, for example a green LED indicating an authentic banknote or object and a red LED indicating false banknote or object, and/or an acoustic indicator or buzzer.

In order to increase the discretion of the verification operation, the LEDs 82—where provided for is/are arranged on the operator side of the cradle 80 and the buzzer—where provided for—emits a signal only in the case of a false object.

Figure 9:
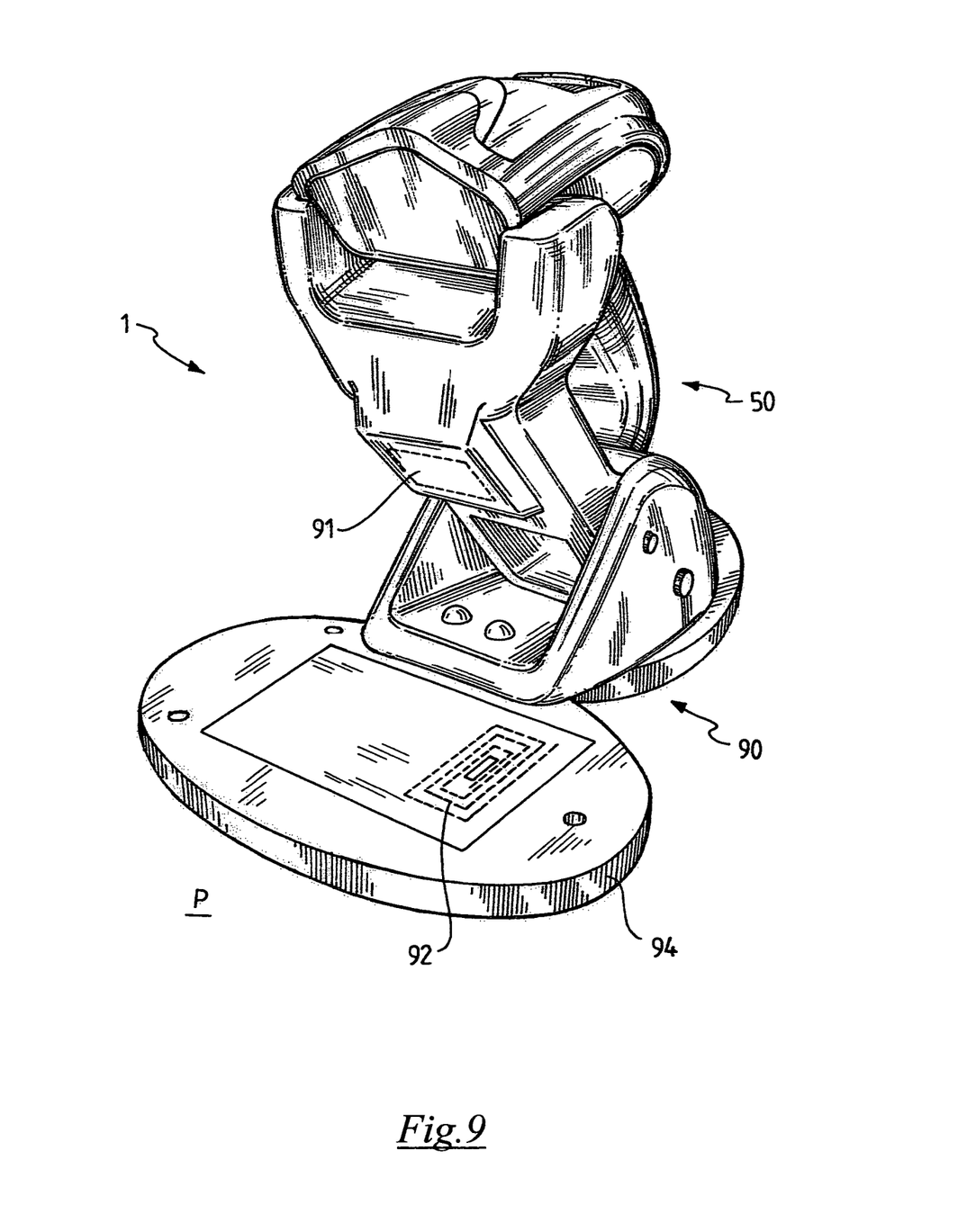

In the embodiment of FIG. 9, the cradle 90, which by way of an example is shown of the orientable type analogously to FIG. 4, comprises an RFID detector 91 as security information interaction device.

The RFID detector 91, analogous to the RFID reader 10 described above, is configured for interacting with an RFID tag 92 contained in a banknote or other object, by decoding the security information therein contained. Regarding the activation of the detector 91, the result indication to the operator and/or the communication with a processor, the abovementioned considerations with reference to the embodiment of FIG. 8 hold true.

The RFID detector 91, in addition to being receiving, can also be transmitting in order to modify the content of a memory of the RFID tag 92 based on processing, for example carried out by the processor with which the reader system 1 is associated.

For example, in the case of a debit card, the residual credit can be initially read by the detector 91, transmitted to the processor which carries out the subtraction of the amount due and transmits the new residual credit to the detector 91, which in turn transmits it to the RFID tag 92 on the object.

It is manifest that the cradle of any of the above described embodiments can be fixed to the support surface P or hung to a sloped or vertical surface.

Similarly, the tray of the cradle—where provided for—can have any one slope with respect to the support or fixing surface P.

It should be understood that the specific shapes of the cradle and the reader of the reading system illustrated and described are merely indicative.

Moreover, it should be understood that the characteristics described with reference to the various embodiments can be variously combined with each other.

What is claimed is:

1. A cradle for a coded information reader, wherein the cradle comprises at least one security information interaction device configured to make security information directly intelligible to a human operator by making it visible, or to decode the security information and provide the operator with a decoding results indication, or to modify the security information.

2. The cradle according to claim 1, wherein said at least one security information interaction device is selected from the group consisting of a UV radiation emitter, an IR radiation emitter, a laser emitter, a white light emitter, a backlit surface, a magnetic sensor and an RFID detector.

3. The cradle according to claim 1, wherein said security information interaction device further comprises an indicator of a security information verification result.

4. The cradle according to claim 1, having an operator side and a customer side, wherein said at least one security information interaction device is arranged on the operator side.

5. The cradle according to claim 1, wherein the cradle is configured for being supported on or fixed to a surface, and wherein said at least one security information interaction device comprises at least one radiation source directed towards said surface.

6. The cradle according to claim 1, comprising at least one selective activation device of said at least one security information interaction device.

7. The cradle according to claim 6, wherein said at least one selective activation device is chosen from the group consisting of an intermittently pulsed activator, a timer, a push-button switch and a receiver of a remote activation command.

8. The cradle according to claim 1, comprising a support tray for a document or object comprising said security information.

9. The cradle according to claim 8, wherein said support tray incorporates a selective activation push-button of said at least one security information interaction device.

10. The cradle according to claim 8, wherein said security information interaction device comprises a transparent or diffusing support surface and a backlighting system in said support tray.

11. The cradle according to claim 1, wherein said at least one security information interaction device comprises a radiation emitter, and further comprising optics for shaping the emitted radiation.

12. The cradle according to claim 1, wherein said at least one security information interaction device comprises a UV or IR radiation emitter, and further comprising a rejection filter for the visible light emitted by said radiation emitter.

13. A coded information reading system comprising a hand held coded information reader and a cradle according to claim 1, said cradle having a seat for the coded information reader.

14. A method, comprising using the coded information reading system according to claim 13 for the authenticity verification of banknotes, documents or objects in a work station.

* * * * *